Sept. 12, 1950 R. W. HOOD 2,522,226
APPARATUS FOR SUCCESSIVELY DISPLAYING
CARDS OR THE LIKE
Filed Dec. 7, 1945 11 Sheets-Sheet 1

INVENTOR.
Richard W. Hood
BY Clarence E. Mead
His Attorney

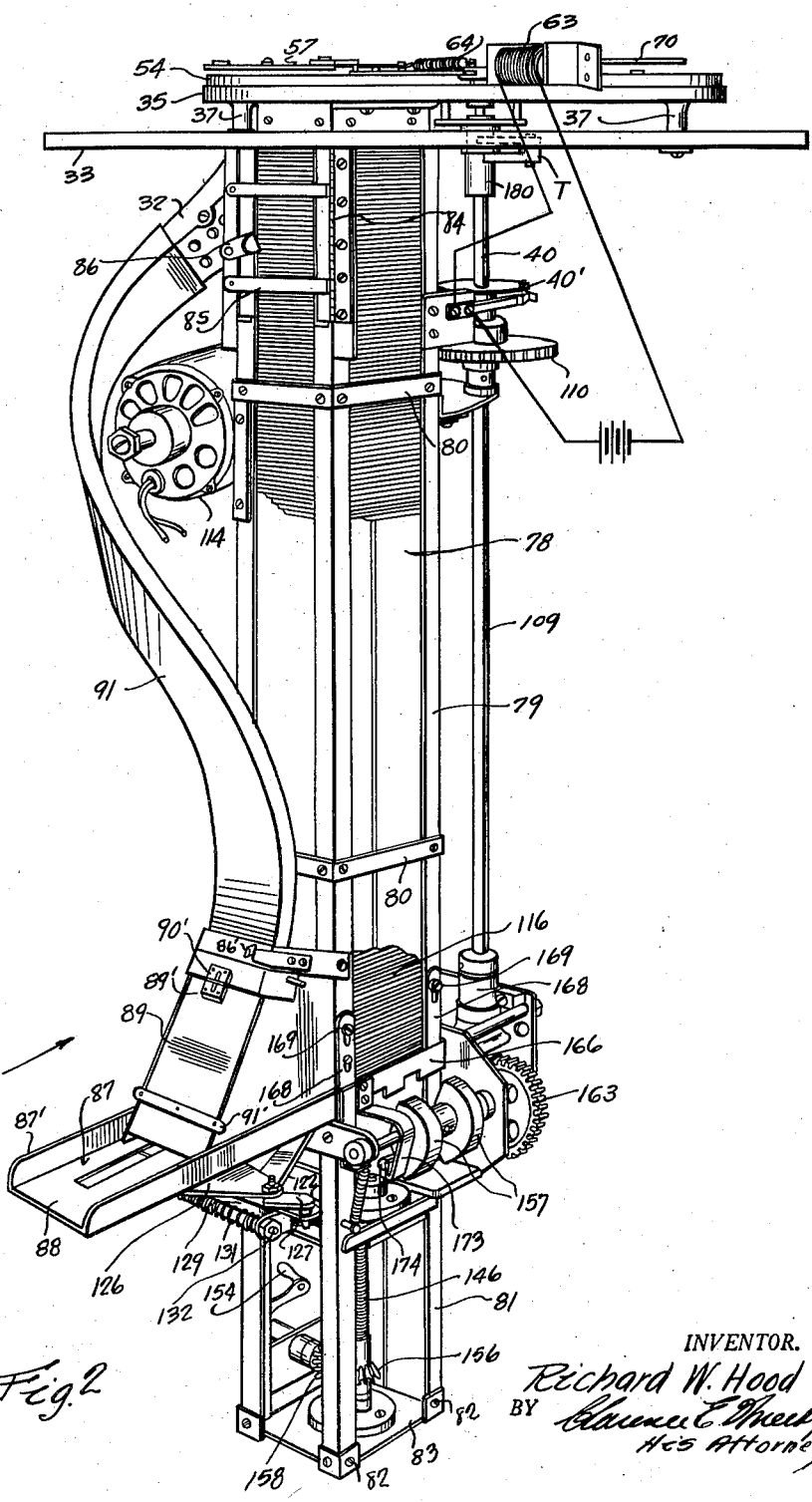

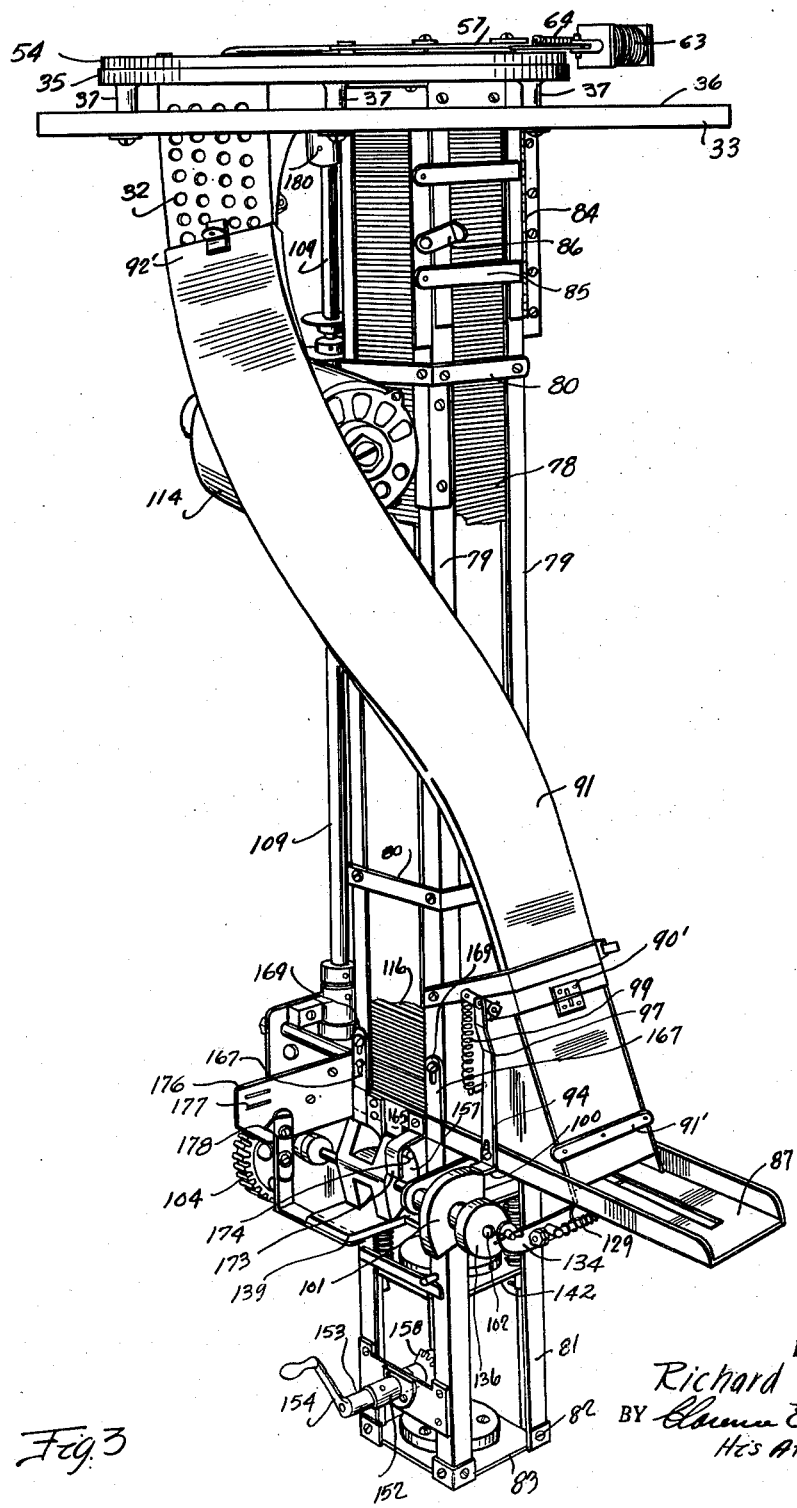

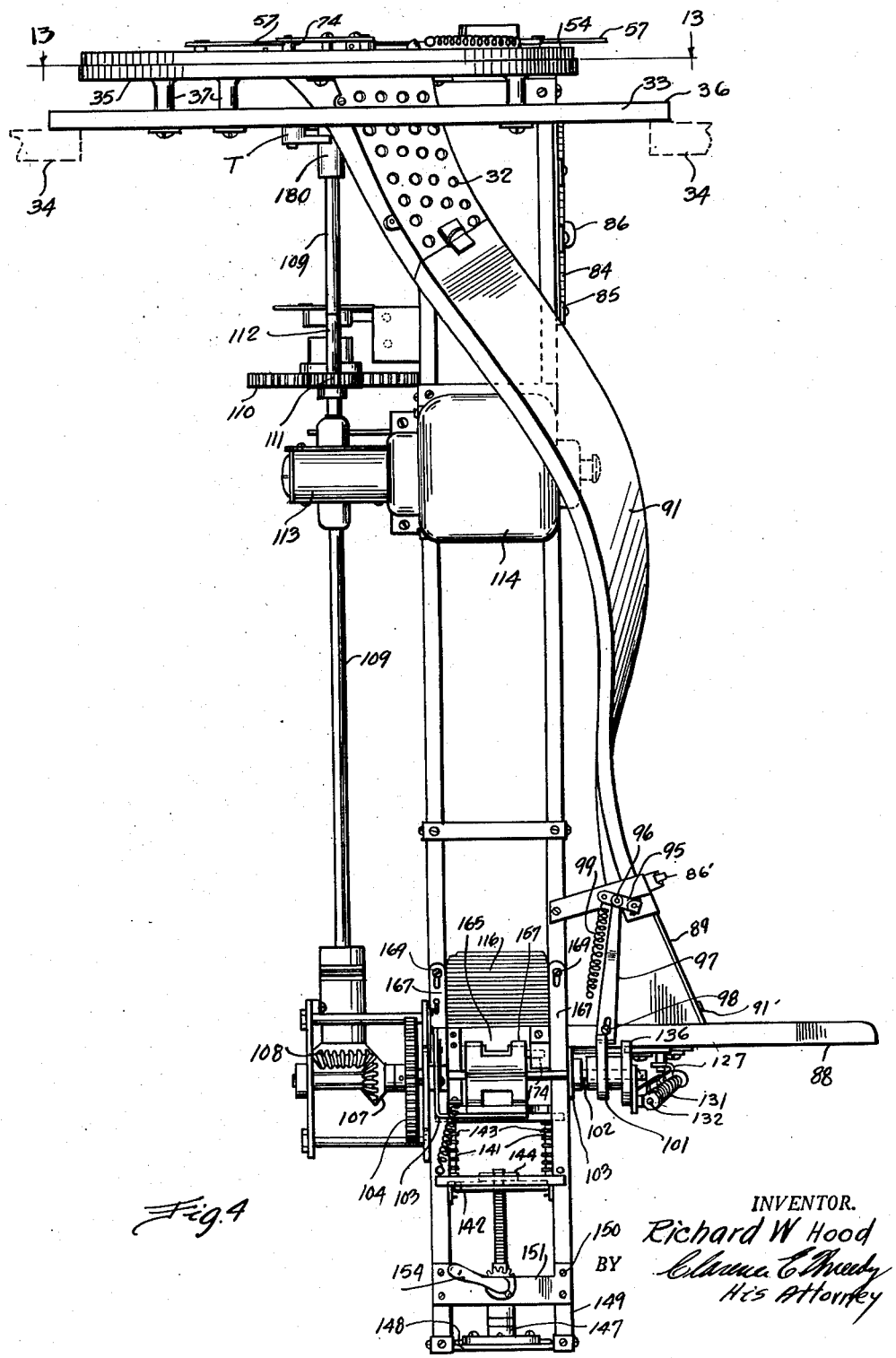

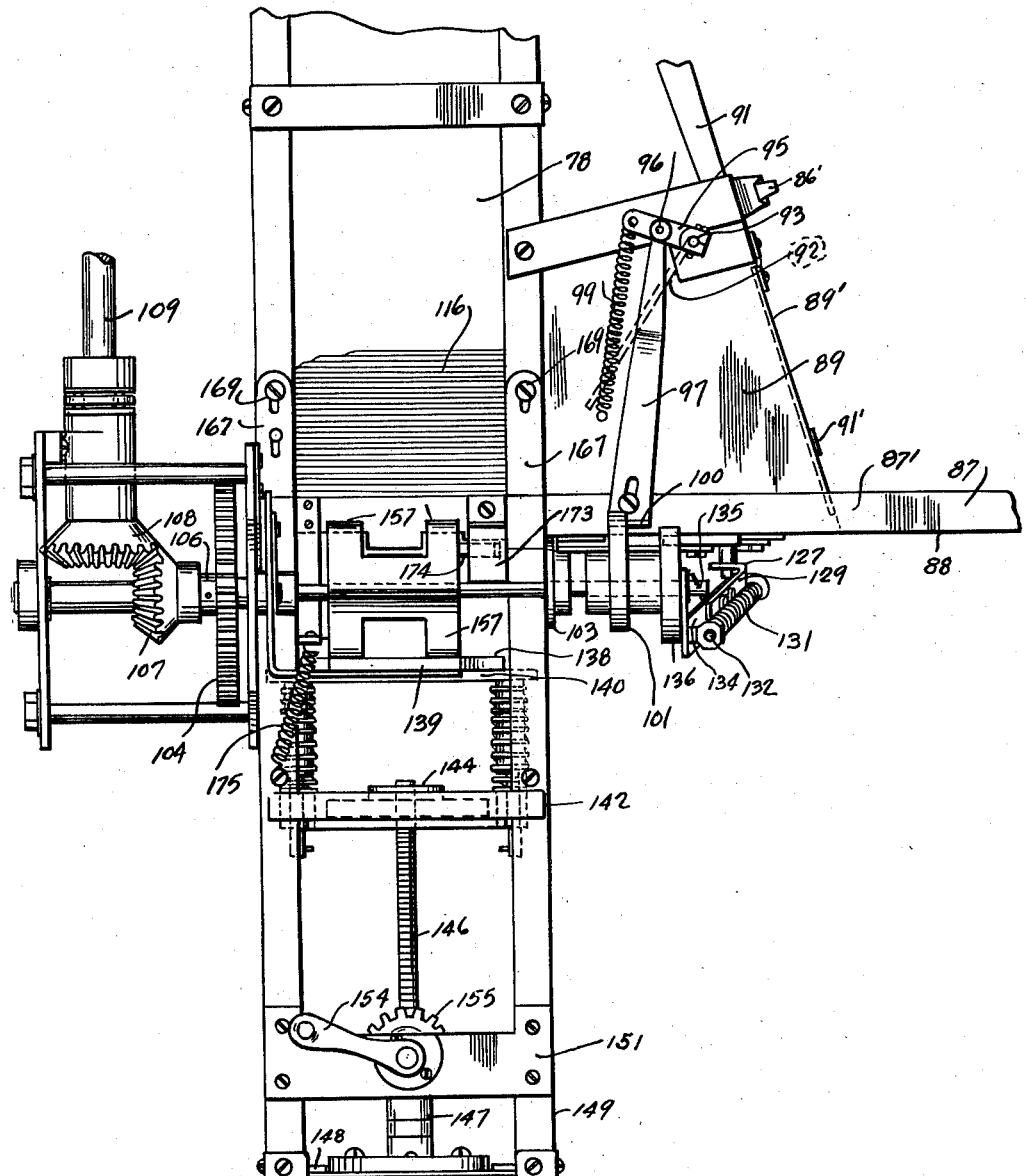

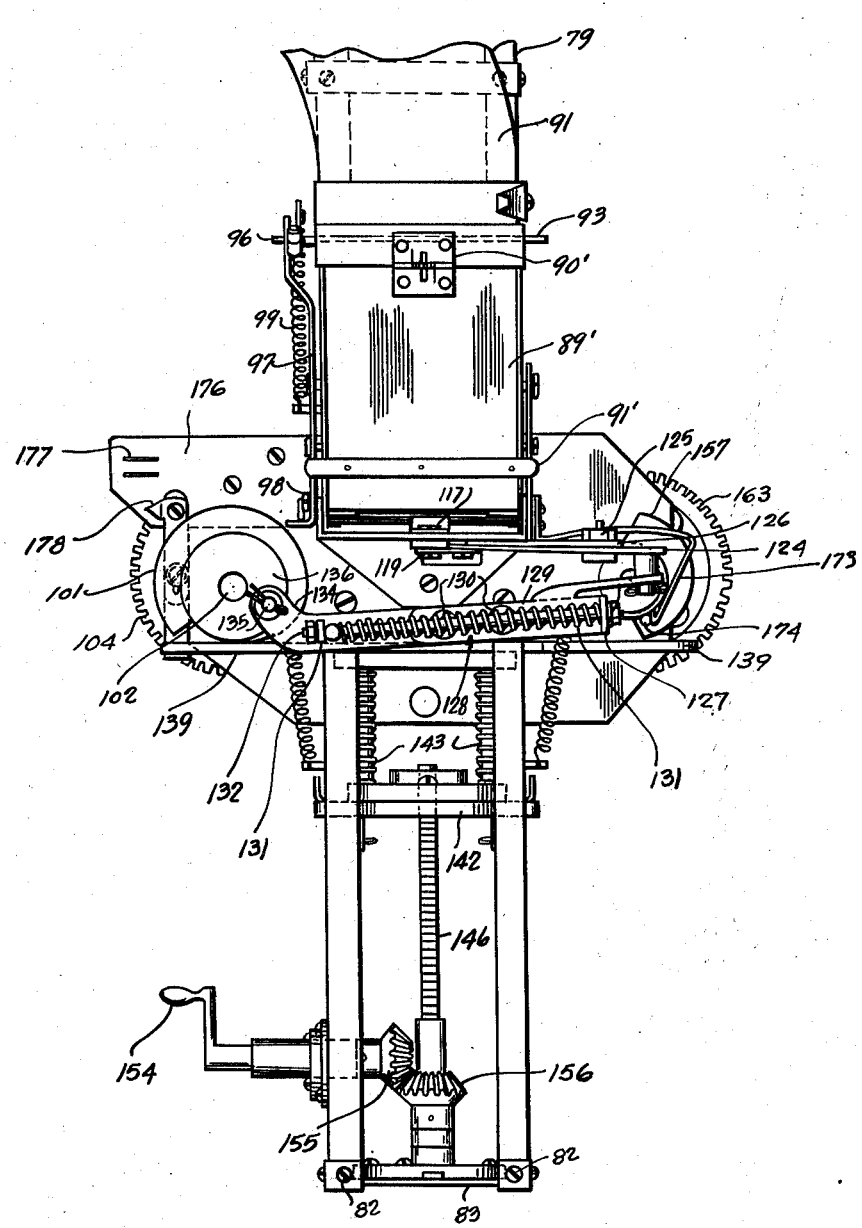

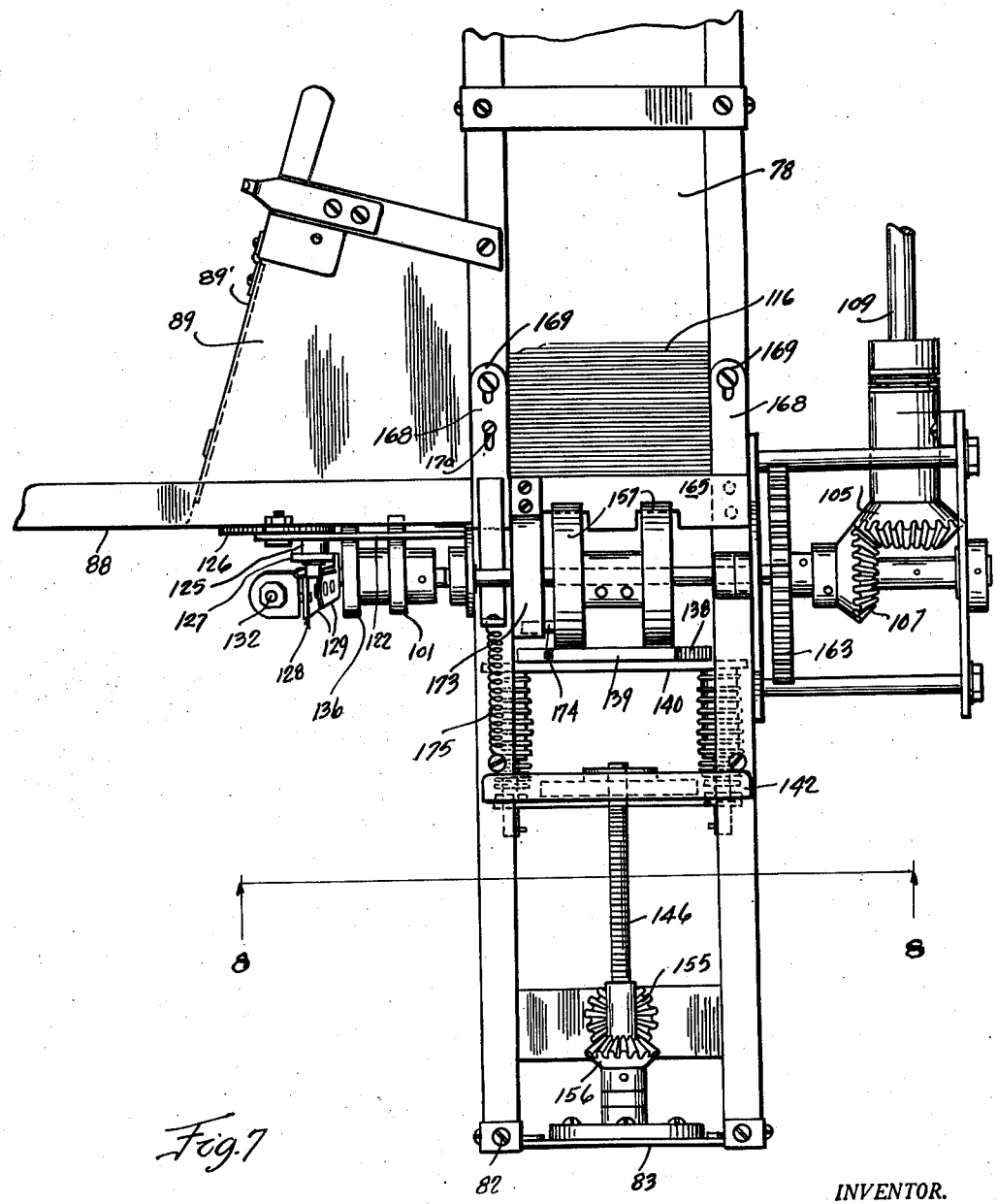

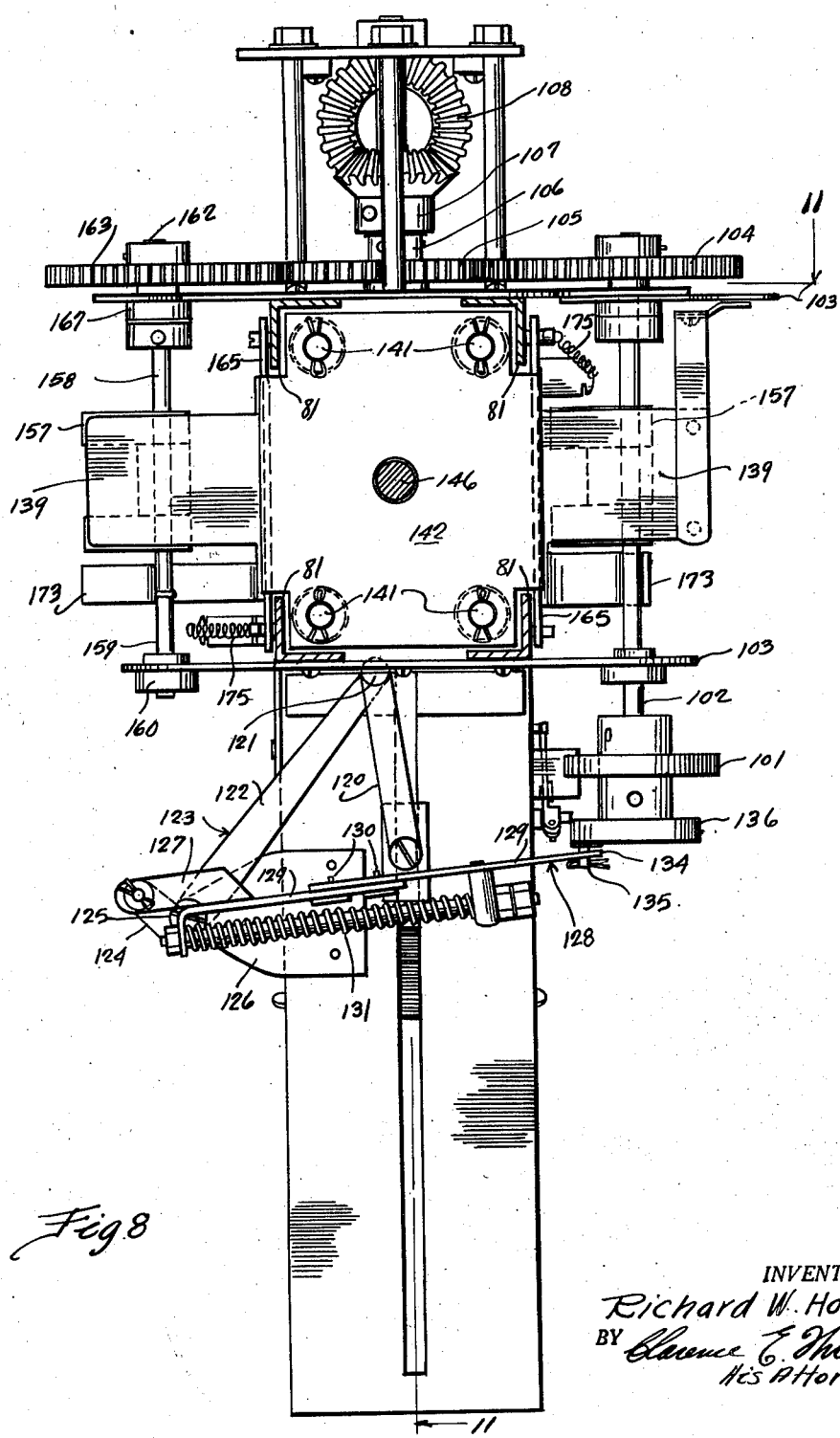

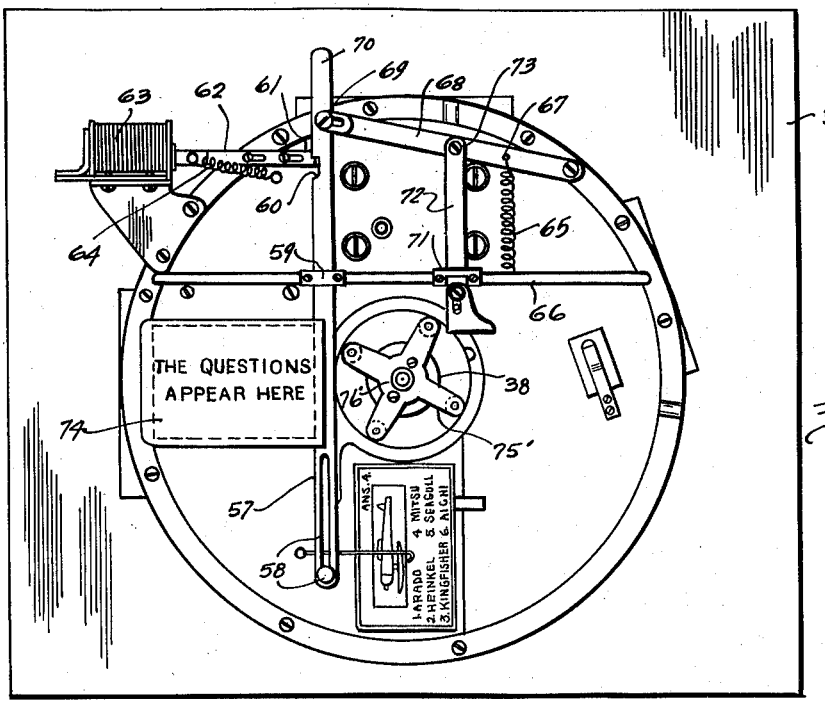

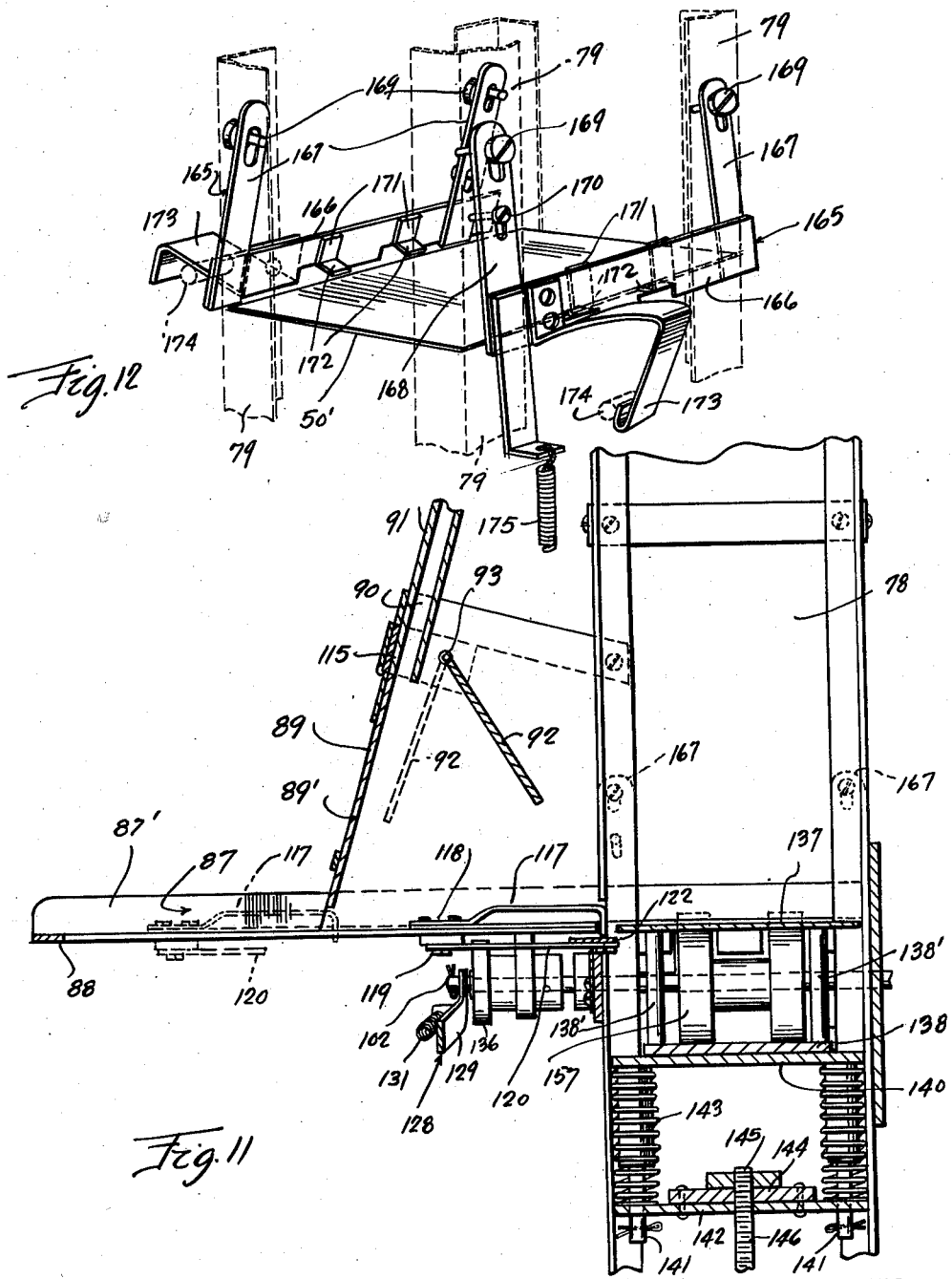

Sept. 12, 1950                    R. W. HOOD                  2,522,226
APPARATUS FOR SUCCESSIVELY DISPLAYING
CARDS OR THE LIKE
Filed Dec. 7, 1945                                           11 Sheets-Sheet 11
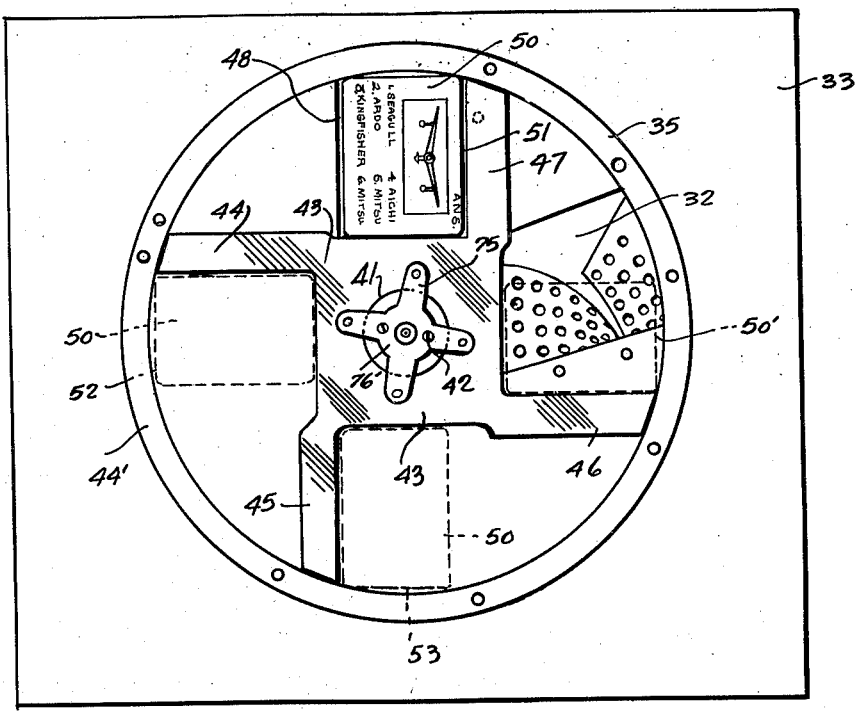
Fig. 13
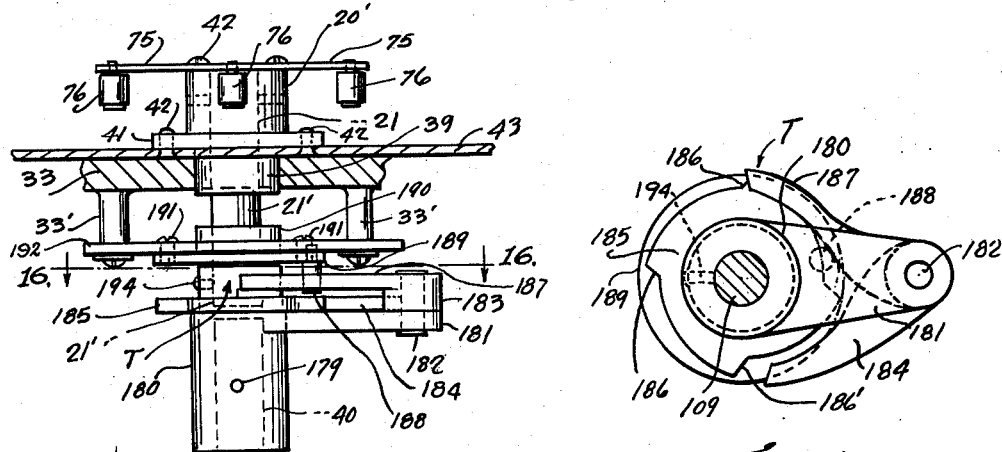
Fig. 14                  Fig. 15
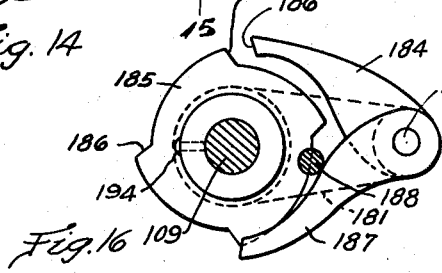
Fig. 16
INVENTOR.
Richard W. Hood
BY
His Attorney Patented Sept. 12, 1950

2,522,226

UNITED STATES PATENT OFFICE 2,522,226

APPARATUS FOR SUCCESSIVELY DISPLAYING CARDS OR THE LIKE

Richard W. Hood, Chicago, Ill.

Application December 7, 1945, Serial No. 633,287

13 Claims. (Cl. 40—36)

This invention relates to an apparatus for successively displaying cards or the like.

More particularly the invention relates to an apparatus of the character hereinafter described, for presenting a card or the like to a viewing opening and, at a predetermined time, to remove the card thus presented, all by means of a stack of cards arranged in a card storage compartment and delivered successively therefrom to the viewing opening, from whence the card is moved to a discharge or exit opening for passage through a return chute, for movement from the bottom of the return chute to the bottom of the stack of cards, thus accomplishing one of the important objects of this invention; namely, that of providing a continuous and uninterrupted circuit for the movement of the cards from the top of the stack to the bottom thereof.

Heretofore in apparatuses for displaying cards, a stack of cards is generally arranged in a compartment and moved by means of a follower in a direction where the cards are successively moved from the top of the stack to a viewing or sight opening from whence the cards are dropped into a storage compartment where they remain until the operator removes them from the storage compartment for replacement in the first compartment. Should the apparatus be under the attendance of a service-man whose duty it is to remove the returned cards from the return storage to the delivery storage compartment, it is obvious that when the delivery storage compartment becomes exhausted, the apparatus will be rendered inoperative and consequently remain idle until such time as the service-man removes the stacked cards from the return storage compartment to the delivery compartment. This has been a serious objection to apparatuses of the type with which this invention is concerned and one in which the cards are moved to viewing position from the top of a stack to the exit of a return storage compartment. It is therefore an object of this invention to provide an arrangement whereby the cards will have continuous and uninterrupted movement from and to the viewing opening without the necessity of rendering the machine inoperative for the purpose of restacking or replenishing the delivery storage compartment.

Another and equally important object of the invention is the provision of a simple and efficient means for delivering the cards successively from viewing position to the bottom of the stack of cards in the delivery compartment.

Another object and equally important feature of the invention is the simple and efficient means for stacking the returned cards beneath the stack of cards in the delivery storage compartment.

Yet another object of the invention resides in the provision of a simple arrangement for successively taking the cards from the top of the stack in the delivery storage compartment and moving the same successively to a viewing opening.

Another object of the invention is the provision for maintaining a uniform compression of the cards in the delivery compartment.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a perspective view of the card stacking mechanism embodied in my invention;

Fig. 3 is a perspective view of the card stacking mechanism embodied in my invention, taken from the left-hand of Fig. 2;

Fig. 4 is a rear elevational view of the card stacking mechanism;

Fig. 5 is an enlarged fragmentary side elevational view of the lower part of Fig. 4;

Fig. 6 is a fragmentary side elevational view taken in the direction of the arrow as indicated in Fig. 2;

Fig. 7 is a side elevational view opposite to that shown in Fig. 5;

Fig. 8 is a sectional detail view taken substantially on line 8—8 of Fig. 7;

Fig. 9 is a plan view of the card stacker as shown in Figs. 2 to 4 inclusive;

Fig. 10 is a plan view similar to Fig. 9 but showing the parts in different positions with respect to each other;

Fig. 11 is a fragmentary sectional detail view taken substantially on line 11—11 of Fig. 8;

Fig. 12 is a perspective view of a card supporting mechanism embodied in the invention;

Fig. 13 is a plan view taken substantially on line 13—13 of Fig. 4;

Fig. 14 is a fragmentary sectional detail view of a clutch embodied in the invention;

Fig. 15 is a sectional detail view of the same taken substantially on line 15—15 of Fig. 14;

Fig. 16 is a sectional detail view taken substantially on line 16—16 of Fig. 14.

Figure 1:
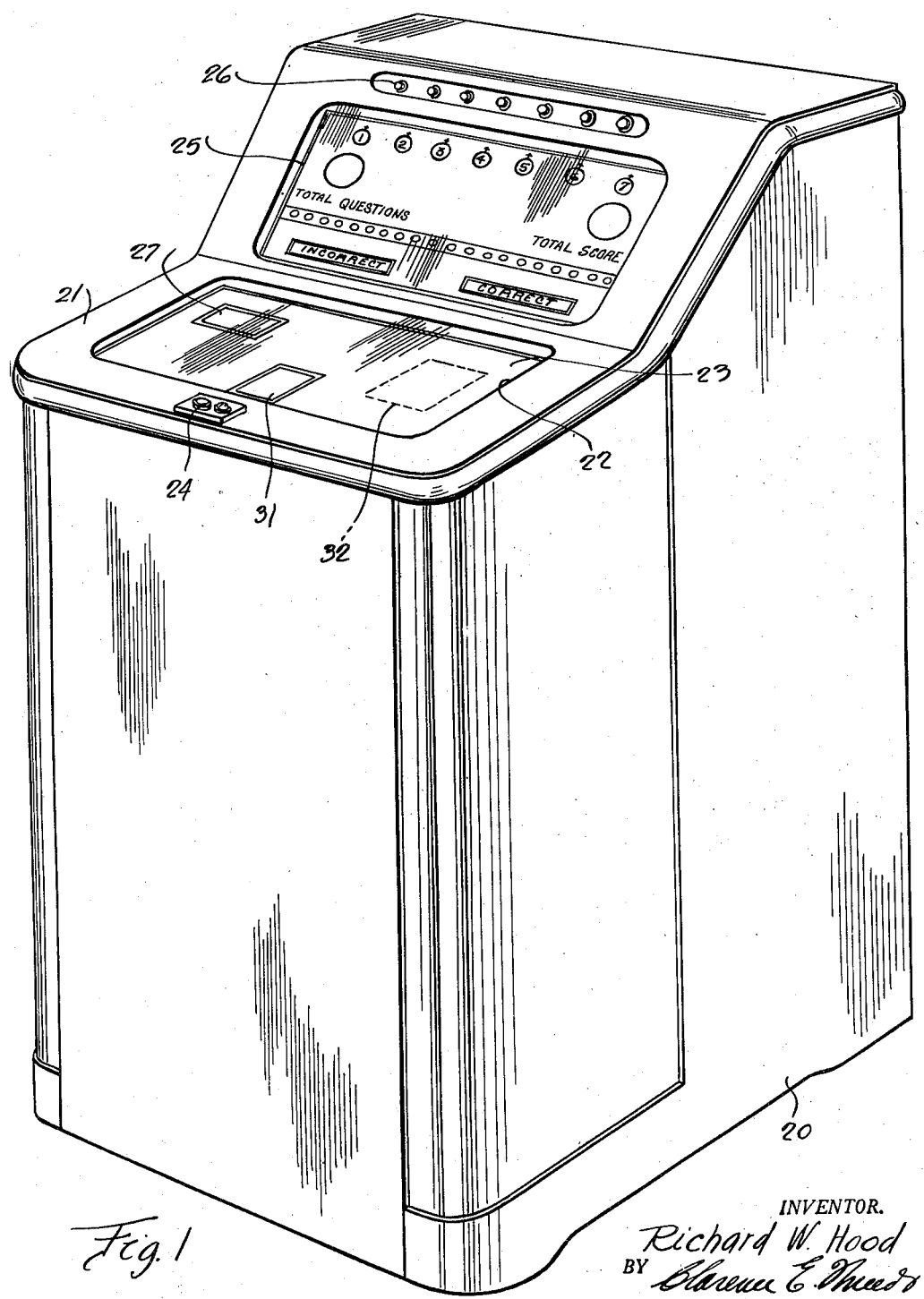
Fig. 1 is a perspective view of an apparatus embodying my invention.

Preferably, though not necessarily, the invention may be associated with an apparatus of the type illustrated in Fig. 1, wherein the apparatus comprises a cabinet 20 having a top wall 21. In this top wall 21 there is an opening 22 normally closed by an opaque glass panel 23. The apparatus illustrated in Fig. 1 provides an operating button 24 which is utilized for setting the apparatus into motion, but as this operating button 24 and its associated parts embody no part of the present invention, the construction and operation thereof will not be shown and described. A score panel is indicated at 25, and this panel 25 includes a plurality of selection buttons 26 designed and intended to be operated by the operator in determining the number of the answer which he has selected as the proper answer to the question presented. Like the operating button 24, this selection button 26 constitutes no part of the present invention and therefore their construction and operation will not be shown or described. For further information as to the use of these selection buttons and the score panel, reference may be had to Patent No. 2,274,811, dated March 3, 1942, granted on an Amusement Apparatus.

The primary object of this invention is to present to a viewing or sight opening a card from the top of a stack of cards contained in a delivery storage compartment, and then return this card to the bottom of the stack in the storage compartment without interrupting the operation of apparatus, and to a description of such operation this description will now be confined.

In the apparatus shown in Fig. 1, the glass panel 23 provides a viewing opening 27 to which a card, such as 50, is presented. This card and each of the successive cards presented to the viewing opening 27 by mechanism more fully hereinafter described, have printed thereon a series of questions 29, each numbered as shown, and relating to a symbol or other indicia 30 appearing thereon. On the upper right-hand corner of the card is the abbreviated word "Ans." and adjacent thereto is a number corresponding to the correct answer to one of the questions presented by the card. When the card 50 is beneath the viewing opening 27, the word "Ans." and the number will be concealed. The mechanism hereinafter described, which presents the card to the viewing opening 27, will at a predetermined time move the card from the opening 27 to a second viewing opening 31, through which opening the entire card, including the answer, will be viewed. From this opening 31 the card is moved to a return throat 32 of a return chute hereinafter referred to.

The mechanism for presenting the cards successively from a stack to these viewing openings 27 and 31 and thence to the return throat 32, includes a mounting board 33 (Figs. 9 and 10). This mounting board 33 is adapted to be supported as at 34 in any suitable manner within the cabinet 20 beneath the panel 23, Fig. 4.

On this mounting board 33 is a circular plate 35 supported in spaced relation with respect to the top surface 36 of the mounting board 33 by suitable spacer blocks 37. This plate 35 is provided with an opening 38 through which projects a bearing 39 formed as an integral part of a flange 41 attached to a hub structure 43 as at 42 (Fig. 13). Formed as an integral part of this flange 41 is a bearing 20', and journalled in this bearing 20' and projecting through the bearing 39 is a stud shaft 21'. This stud shaft 21' is pinned to bearing 20' for rotation therewith.

This stud shaft 21' has operative connection through the medium of a suitable clutch structure T (Fig. 14) with the upper end portion 40 of a drive shaft 109 hereinafter more fully set forth. This clutch structure T may be of any approved construction, such as will permit an intermittent rotation of the stud shaft 21' to intermittently move the feeder blades 44, 45, 46 and 47 over the surface of the plate 35 for reasons hereinafter set forth. This clutch structure T will be more fully hereinafter set forth.

In the plate 35 there is formed an opening 48 communicating with the upper end portion of a stacking compartment 78, in which compartment there is arranged, under compression, a stack of cards, the uppermost of which being indicated at 50 (Fig. 13). As shown in Fig. 13, the blade 47 engages an edge 51 of the card 50. Upon rotation of the hub structure 43, this blade 47 will move the card 50 to the position indicated in dotted lines at 52 beneath the viewing opening, thus presenting a series of questions to the viewer. At a predetermined time, this blade 47, now having moved to the position of blade 44, will move to the position of the blade 45, and thus move the card 50 beneath the viewing opening 31, in the position shown at 53, at which time the abbreviated word "Ans." in the upper right-hand corner of the card, will be presented through the opening 31 to the view of the operator. At a predetermined time, the blade 47 will move the card to the position of the blade 46, in a position whereby the card, now indicated at 50', upon the next movement of the hub structure 43, will drop through the throat 32 for return to the bottom of the stack of cards in the delivery compartment 46, in a manner hereinafter more fully set forth.

Disposed upon the circular plate 35 is a top plate 54 similar in shape to that of the plate 35 and having formed therein a viewing opening 55 which registers with the viewing opening 27, and a viewing opening 56 which registers with the viewing opening 31.

It is desirable to provide a shutter for concealing the next card to be moved to the viewing opening 27 while the card 50 displays the answer, so that the operator cannot be reading the questions of the succeeding card while reading the answer displayed through the answer-viewing opening 31. This mechanism, in the present instance, includes a bar 57 movable transversely of the circular plate 54 and having a slot and pin connection 58 therewith to be properly guided in a longitudinal movement beneath a strap plate 59. In this bar 57 is a notch 60 adapted to be engaged by a latch head 61 of a solenoid bar 62 of a magnetic coil 63 and normally projected outwardly into engagement with the notch 60 by a spring 64. This coil 63 is connected in circuit with a suitable timing mechanism 40', Fig. 2, (embodying no part of the present invention) which causes the coil at a predetermined time to be energized so as to withdraw the latch head 61 from the notch 60 to permit the bar 57 to be moved in the direction of its length under the action of a spring 65 connected at one end 66 to the plate 54 and at the opposite end 67 to a link 68 having slot and pin connection 69 with the end 70 of the bar 57. A strap 71 supports for longitudinal movement a link 72 having its end connected as at 73 to the link 68.

On the bar 57 is a shield plate 74 which moves with the bar 57 from and to closing position with respect to the viewing opening 55. Secured to the bearing 20' as at 75' is a hub 76', and extending radially from this hub 76' are fingers 75, each carrying a roller element 76 adapted to engage an adjustable foot 77 carried by the link 72.

The arrangement is such that in the normal position of the shield 74, it closes the viewing opening 55. This position is shown in Fig. 9. Upon energization of the coil 63 at a predetermined time, the latch 61 will be withdrawn from engagement in the notch 60, permitting the bar 57, under action of the spring 65, to move longitudinally in a direction to move the shield plate 74 from closing position with respect to the viewing opening 55, thus allowing the card 50 therein to be viewed and the questions read.

As the collar 41 is rotated, the roller 76 adjacent the foot 77 will move into engagement with this foot and thus impart a longitudinal movement to the link 72, which in turn pivots the link 68 against the action of the spring 65 to move the bar 57 in a position where the latchhead 61, upon deenergization of the coil 63, will move, under the action of the spring 64 into latched engagement with the bar 57, and thus hold the shield plate 74 in closed position with respect to the viewing opening 55.

Suspended from the plate 35 is an enclosure 78 for housing a stack of cards, said enclosure being referred to as a stacking compartment. The upper end of this stacking compartment 78 communicates with the opening 48 formed in the plate 35 and through which the cards are successively projected. In one form of construction, this stacking compartment comprises corner bars 79 preferably angular in cross section and connected together by bands or straps 80, with the lower end portions 81 of these bars connected as at 82 to a base plate 83. Hinged to one of the bars 79, as at 84, is a door 85 normally latched in place by a suitable latch structure 86, the arrangement being such that cards are stacked in the stacking compartment by admitting the cards through the upper end thereof when the door 85 is in open position.

At the lower end portion of the stacking compartment 78 there is provided a trough 87 which extends in a horizontal plane substantially at right angles with respect to the stacking compartment 78. This trough includes parallel side walls 87' and a bottom wall 88. A receiving housing is indicated at 89. This receiving housing 89 is positioned at the lower portion of the stacking compartment, and in this housing or enclosure the card to be stacked is tilted from a substantially vertical position to a horizontal position for movement beneath the stack 116 of the cards in the stacking compartment. This receiving housing or enclosure includes a door 89' hinged as at 90' and has a transverse bar 91' which limits the movement of the door into closed position as shown in Fig. 11. The door 89' is held in open position by a suitable spring latch 86'. Communicating with this housing 89 is the lower end portion 90 of a return chute 91. The upper end portion 92' of this return chute 91 has communication with the return throat 32. It is through this return chute 91 that the cards are delivered from the throat 32 to the housing 89 for return to the bottom of the stack of cards in the stacking compartment 78, and this is accomplished in the following manner.

Arranged in the housing 89 is a plate 92. This plate 92 is carried by a shaft 93 pivotally carried by the side walls 94 of the housing 89. Connected to one end of this shaft (Fig. 4) is a link 95. Pivotally connected to this link 95, as at 96, is the end portion of a bar 97 having slidable connection with the adjacent side wall 87' of the trough 87 by means of a slot and pin connection 98. Pivotal movement of the plate 92 to the position shown in Fig. 11 is normally urged by a spring 99 (Fig. 4). This bar 97 (Fig. 3) has a horizontal portion 100 which bears upon a cam 101. This cam 101 is fixed to a shaft 102. This shaft 102 is journalled in suitable brackets 103 and at its end portion carries a gear 104. This gear 104 meshes with a gear 105 carried by a suitable shaft 106, on which shaft is fixed a bevel gear 107 meshing with a bevel gear 108, the bevel gear 108 being fixed to a shaft 109. This shaft 109 has secured thereto a gear 110 operatively meshing with a pinion 111 fixed to a shaft 112 driven by a chain of reducing gears contained within a housing 113 and driven by a motor 114.

The arrangement is such that at a predetermined engagement between the cam 101 and the portion 100 of the bar 97, the plate 92 will be pivoted to the position shown in dotted lines (Fig. 11), so that a card which has descended through the chute 91, upon reaching the discharge end 115, will lean against the plate 92, and as the plate 92 is caused to pivot in a clockwise direction by operation of the cam 101 and the bar 97, the card will be caused to fall to the right as viewed in Fig. 11, into a position for movement beneath the stack of cards as indicated at 116, by means of a follower mechanism now to be described.

This follower mechanism (Figs. 8 and 11) includes a follower bar 117 movable longitudinally within the trough 87. The end 118 of this bar 117 is connected as at 119 to a link 120 in turn connected as at 121 to an arm 122 of a bell crank 123, the arm 124 of which is pivotally connected as at 125 to a bracket 126 extending outwardly from beneath the trough 87.

This arm 124 is connected as at 127 to a connecting rod 128 comprising two bar members 129 connected together for longitudinal movement with respect to each other as at 130 and governed in such longitudinal movement by means of a spring 131 carried by a rod 132 in turn connected as at 133 to the bars 129, as shown in Figs. 6 and 8. The end 134 of this connecting rod 128 is connected by means of a pin 135 to a disc 136 mounted on the shaft 102. The arrangement is such that at a predetermined time resulting between the timed operation of the plate 92 and the follower 117, the follower will be moved to the dotted line position indicated in Fig. 11. When in this position, the card descending from the return chute 91 will have disposed itself flatly upon the bottom 88 of the return trough 87, so that upon movement of the follower from the dotted line position to the full line position, the card will be moved beneath the stack of cards in the stacking compartment 78.

In order to properly move the card to a position beneath the stack of cards in the stacking compartment 78, it is desirable that the stack of cards already confined in the stacking compartment be held from dropping downwardly, which dropping or moving downwardly would obstruct the movement of the incoming card to a position beneath the stack of cards in the stacking compartment. This holding mechanism will now be described.

Normally the stack of cards in the stacking chamber 78 is supported by a compression plate 137 (Fig. 11) which constitutes the bottom wall of the stacking compartment. This compression plate 137 is supported in spaced relation with respect to a plate 138 by means of spacer bars 138', the plate 138 extending in parallel relation with respect to the plate 137 and having oppositely disposed, extended portions 139 (Fig. 8). This plate 138 is carried by a carriage plate 140, and this carriage plate 140 has depending therefrom at the corners thereof, pin members 141. These pin members 141 project through a pressure plate 142, and encircling these pins 141 and disposed between the plate 140 and plate 142 are compression springs 143.

Fixed to the plate 142 is a bearing 144, and threaded through this bearing 144 is the end portion 145 of a screw shaft 146. The lower end portion of this screw shaft 146 rotates in a suitable bearing 147 secured to a base plate 148 in turn connected to the lower end portions 149 of the corner bars 79.

Secured to adjacent pairs of these corner bars 79 as at 150 is a plate 151. This plate 151 carries a bearing 152 in which a shaft 153 rotates. One end of this shaft 153 carries an operating handle 154. The opposite end of this shaft carries a bevel gear 155 which meshes with a bevel gear 156 secured to the screw shaft 146 in any suitable manner.

The arrangement is such that by rotating the handle 154, the screw shaft 146, if rotated in a clockwise direction, will move the plate 142 upwardly against the springs 143, and as these springs 143 are compressed they will exert upward movement to plate 140, and this upward movement of the plate 140 in turn will move the plate 137 against the bottom of the stack of cards, thereby maintaining the cards in stacked, compressed condition within the stacking compartment. This movement of the plates 140 and 138 by the action of the springs 143 is controlled by cams 157 arranged in pairs on opposite corresponding sides of the stacking compartment and engaging the extensions 139 as shown in Fig. 8. One pair of the cams 157 is fixed to the shaft 102 and rotatable therewith, while the other pair of the cams 157 is fixed for rotation with a shaft 158. This shaft 158 has its end portion 159 journalled in a suitable bearing 160, while the other end of the shaft 158 projects through a bearing 161 and carries at its end portion 162 a gear 163 which operatively meshes with the gear 105.

The arrangement is such that upon rotation of the cams, when such cams are rotated to bring their high points (such as indicated at 164) away from the extensions 139, the plate 140 will be permitted to move upwardly under the action of the springs 143 and consequently bear the stacking plate 137 against the bottom of the stack of cards in the stacking compartment 78. However, when moving a card along the receiving trough to a position beneath the stack of cards in the stacking compartment 78, it is necessary that the plate 137 be lowered from engagement with the bottom of the stack of cards in this stacking compartment 78, out of movement of the incoming card. At the same time it is necessary that the stack of cards within the stacking compartment 78 be supported against dropping down so as to obstruct the movement of the incoming card. This is accomplished by a mechanism illustrated in Fig. 12, which will now be described.

On each corresponding side of the structure providing the stacking compartment 78, there is arranged a U-shaped structure 165 comprising a crossbar 166 and opposite parallel arms 167 and 168. These arms 167 and 168 have slot and pin connection as at 169 with the adjacent corner bars 79 providing the stacking compartment 78, thereby to allow, if required, any vertical movement of the supporting structure 165. The supporting structure 165 is adapted to pivot on the slot and pin connections 169, to the position shown in full lines in Fig. 12, which position is from card-supporting position, the card being indicated at 50'. This pivotal movement of the supporting structure is limited by a limiting pin 170 carried by an adjacent corner bar 79. The crossbar 166 carries spaced plates 171, and these plates 171 are provided with horizontal lips 172 which are adapted to engage beneath the card 50'. Each of the crossbars carries an arm 173, and these arms 173 are adapted to be engaged at a predetermined time by pins 174 carried by the cams 157. The arrangement is such that as the cams 157 rotate, the pins 174 will bear against the arms 173 and pivot the supporting structures 165 to the position shown in full line in Fig. 12. This will dispose the lips 172 from card-supporting position. When these lips 172 are disposed from card supporting position, the plate 137 is in card-supporting position.

In other words, the mechanism is timed to operate as follows:

When the follower 117 functions to move a card along the receiving trough 87 to a position beneath the stack of cards in the stacking compartment 78, the plate 137 will move downwardly out of the way of the moving card from the trough 87, and simultaneously with this movement the pins 174, by the action of the cams 157, will be rotated to permit the supporting structures 165 to pivot toward each other to dispose the lips 172 beneath the stack of cards and thus hold the stack of cards in the stacking compartment 78 until the follower 117 has positioned the incoming card beneath the stack of cards upon the plate 137, at which time the plate 137 is moved upwardly by the compression springs 143 and the supporting structures pivoted by the action of the pins 174 to the position shown in Fig. 12, where the lips 172 will be disposed from supporting position with respect to the stack of cards. Thus, it will be seen that the incoming card is moved by the follower 117 beneath the stack, without the stack of cards or other mechanism interfering with such movement.

To complete this structure, each of the supporting structures 165 in their pivotal movement to full line position as shown in Fig. 12, is against the action of a coil spring 175.

The plate 35 provides an annular guiding flange 44' which cooperates with the blades of the hub structure to move the cards within the area provided by this guiding flange 44'.

In the operation of the apparatus, the card 50 is presented in the opening 48 in a position to the left of the blade 47, whereupon, upon rotation of the blade 47, the leading edge thereof having passed over a protuberance 51', will engage the adjacent edge of the card and move the card from position in this opening 48 to a position beneath the viewing opening 27. The card having been moved to the viewing opening 27, by mechanism (not shown) timed to operate at this state of the operation of the apparatus, will energize the coil 63 to withdraw the latch 61 from the notch 60, thus permitting the shield plate 74 to move from obstructing position with respect to the opening 27, whereupon the operator may view the card 50 and read the questions appearing thereon. The motor 114, which rotates the shaft 40, continues to operate, but due to the clutch structure 39 hereinafter more fully set forth, the rotation of the blades is momentarily stayed, giving the operator sufficient time to read the several questions. When the blades begin again to rotate, the card is moved by the adjacent blade to a position beneath the viewing opening 31, which opening 31, by reason of its size with respect to the card, exposes the trailing edge portion thereof so as to display to the operator the answer, as indicated at 49'. In moving the card from beneath the viewing opening 27 to a position beneath the viewing opening 27 to a position beneath the viewing opening 31, a roller 76 would have engaged the foot 77 to effect longitudinal movement of the bar 57 to again dispose the shield 74 in obstructing position through the viewing opening 27, whereby the questions on the next succeeding card are concealed from the view of the operator while he is reading the answer of the moved card through the viewing opening 31. Continued movement of the blades will move this card 50 to a position where it will fall by gravity into the throat 32 and thence descend through the return chute 91.

To tilt the card in a proper direction as it descends down the throat, it will be noted that the wall 32' of the throat tapers downwardly and away from the upper portion thereof so that the card will take a circuitous course in its movement to the receiving trough 87. As the card 50 descends from the lower end portion 90 of the chute 91, it will fall into the receiving trough 87 with its leading edge striking the bottom wall 88 of such trough from which position the card will fall with its flat side upon the bottom wall 88 of the trough 87. To time this movement of the card from the time its leading edge strikes the bottom wall 88 to the time it takes its flat position upon such bottom wall, the mechanism which pivotally moves the plate 92 is so timed as to pivot the plate 92 from its full line position to a dotted line position as shown in Fig. 11. As the plate 92 pivots in an anti-clockwise direction, the card will be free to tilt and thus reach a flat position upon the bottom wall 88 of the receiving trough 87, at a time when the follower 117 has, by mechanism timed with the mechanism for pivotally moving the card 92, moved to the dotted line position shown in Fig. 11, from which position the follower moves inwardly to project the card beneath the bottom of the stack of cards in the stacking compartment 78.

Just prior to this movement of the card by action of the follower 117, the plate 137 will be caused to move downwardly in a manner hereinbefore stated, and the lips 172 of the supporting structures 165 will be permitted to move beneath the stack of cards, thereby to support the stack of cards in the stacking compartment until the follower has moved the card 50 beneath the stack, at which time, by virtue of the timed relationship between the mechanisms hereinbefore described, the supporting structures will again pivot to the full line position shown in Fig. 12 and the plate 137 moved beneath the stack of cards to support the stack of cards in a position to present successively the uppermost card to the opening 27, where the cycle of operation just described, again takes place.

If desired, there may be provided a plate 176, and on this plate there may be formed by engraving, embossing, or the like, graduation lines 177 to cooperate with an indicator 178 carried by the adjacent portion 139 of the plate 140, so as to indicate to the operator the degree of compression to which the stack of cards has been subjected.

As before stated, the clutch T may be of any approved construction such as will effect intermittent movement of the feeder blades 44, 45, 46 and 47. In Figs. 14 and 15, I have shown a suggested form of clutch structure for this purpose. In this form of construction, as shown in Fig. 14, there is attached to the end portion 40 of the shaft 109, as at 179, a sleeve 180. This sleeve 180 has a laterally projecting arm 181, and pivoted to this arm 181 as at 182 is a hub 183. Extending from one side of this hub 183 is a latch arm 184 disposed in the path of rotation of a disc 185 having formed in the periphery thereof steps or shoulders 186 disposed from each other at an angle of 90° and adapted to be engaged by the latch arm 184.

Extending from the hub 183 on the side opposite to the latch arm 184, is a trip finger 187. This trip finger 187 is adapted to engage a pin 188 carried by a flange 189 formed as an integral part of a bearing 190 and connected as at 191 to a plate 192, which plate 192 is suspended in spaced relation from the mounting board 33 by means of suspension lugs 33'.

The stud shaft 21' projects through the bearing 190 into the hub 193 formed as an integral part of the disc 185 and is keyed to the hub 193 as at 194.

The arrangement is such that upon rotation of the shaft 109, the sleeve 180 will rotate therewith, rotating the arm 181 in a direction to bear the trip finger 187 against the pin 188 under which condition, as the trip finger 187 rotatably bears against the pin 188, it will be pivoted by this pin in a direction to dispose the latch arm 184 in engagement with the advancing shoulder 186 and thereby, upon engagement with the shoulder 186, couple the shaft 21' for simultaneous rotation with the shaft 109 to rotate the feeder fingers 44 to 47 inclusive through an arc of 90°. As soon as the trip finger 187 rides off the pin 188, the latch arm 184 will be self-disengaged from the contacting shoulder 186 by bearing action of the shoulder against the tapered end 186' of the arm 184 and the rotatable connection between the shaft 109 and stud shaft 21' will be discontinued and the feeder fingers will remain idle until the trip finger is again rotated by rotation of the shaft 109 to again engage the pin 188, at which time the latch finger 184 will again engage the step or shoulder 186 and impart rotation to the feeder fingers or blades 44 to 47 inclusive through an arc of 90°.

It is to be understood that the several cams employed in the construction of the foregoing apparatus are to be timed so that the mechanisms controlled thereby will operate at the proper time and with the highest degree of accuracy, no attempt being made here to show the timing of such cams, as that may vary in many respects without departing from the spirit of the invention.

It is intended, however, it is not necessary, that there be associated with the apparatus 20 a scoring mechanism to indicate the length of time that the player or operator has taken to determine the answer and to award a score for his alertness and quickness in answering the questions presented. Such scoring mechanism has not been illustrated as it does not embody any part of the present invention.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An apparatus of the class described comprising a member having a surface upon which cards from a stack of cards are adapted to be moved and including an inlet opening to which the cards are successively fed for movement over said surface and an outlet opening through which the cards pass from said surface, and spaced sight openings through which the cards are successively viewed in their movement over said surface from the inlet opening to the outlet opening, means for moving said cards over said surface from the inlet opening to the outlet opening, means for successively feeding cards from said stack to said inlet opening, means for receiving the cards from said outlet opening, and means for delivering the cards from said card receiving means to a position below said stack of cards, said card moving means including a guiding flange provided by said member, a rotatable hub structure, and blade members extending radially from said hub structure and operable within said guiding flange and having leading edge portions adapted to engage adjacent edge portions of said cards.

2. An apparatus of the class described comprising a member having a surface upon which cards from a stack of cards are adapted to be moved and including an inlet opening to which the cards are successively fed for movement over said surface and an outlet opening through which the cards pass from said surface, and spaced sight openings through which the cards are successively viewed in their movement over said surface from the inlet opening to the outlet opening, means for moving said cards over said surface from the inlet opening to the outlet opening, spring-compressed means for successively feeding cards from said stack to said inlet opening, means for receiving the cards from said outlet opening, means for delivering the cards from said card receiving means to a position below said stack of cards, said card moving means including a guiding flange provided by said member, a rotatable hub structure, and blade members extending radially from said hub structure and operable within said guiding flange and having leading edge portions adapted to engage adjacent edge portions of said cards.

3. An apparatus of the class described comprising a member having a surface upon which cards from a stack of cards are adapted to be moved and including an inlet opening to which the cards are successively fed for movement over said surface and an outlet opening through which the cards pass from said surface, and spaced sight openings through which the cards are successively viewed in their movement over said surface from the inlet opening to the outlet opening, means for moving said cards over said surface from the inlet opening to the outlet opening, means for successively feeding cards from said stack to said inlet opening, means for receiving the cards from said outlet opening, and means for delivering the cards from said card receiving means to a position below said stack of cards including a reciprocatory follower, said card moving means including a guiding flange provided by said member, a rotatable hub structure, and blade members extending radially from said hub structure and operable within said guiding flange and having leading edge portions adapted to engage adjacent edge portions of said cards.

4. An apparatus of the class described comprising an enclosure adapted to contain a stack of cards, a card return chute, means for successively moving cards from the top of said stack to the entrance of said return chute for gravitation down said return chute, means for receiving the cards from said return chute, means cooperating with said card receiving means for delivering cards received thereby beneath the bottom of the stack of cards in said enclosure, said last-named means including a reciprocatory follower, a first means for supporting the stack of cards in said enclosure, means for moving said first means from engagement with said stack of cards when said follower is operative to move a card beneath said stack of cards, a second means for supporting said stack of cards in said enclosure when said first means is moved from stack supporting position, means for operating said first means and said second means in timed relation with respect to each other whereby said first means will be moved from card supporting position with respect to said stack of cards and said second means will be moved into card supporting position when said follower is moved to project the card received by said card receiving means beneath the stack of cards, and means for moving said follower in timed relation with respect to the operation of said first and second operating means.

5. An apparatus of the class described comprising an enclosure adapted to contain a stack of cards, a card return chute, means for successively moving cards from the top of said stack to the entrance of said return chute for gravitation down said return chute, means for receiving the cards from said return chute, means cooperating with said card receiving means for delivering cards received thereby beneath the bottom of the stack of cards in said enclosure, said last-named means including a reciprocatory follower, a first means for supporting the stack of cards in said enclosure, means for moving said first means from engagement with said stack of cards when said follower is operative to move a card beneath said stack of cards, a second means for supporting said stack of cards in said enclosure when said first means is moved from stack supporting position, means for operating said first means and said second means in timed relation with respect to each other whereby said first means will be moved from card supporting position with respect to said stack of cards and said second means will be moved into card supporting position when said follower is moved to project the card received by said card receiving means beneath the stack of cards, and means for moving said follower in timed relation with respect to the operation of said first and second operating means, and means varying the pressure of engagement between the said first means and the stack of cards.

6. In an apparatus of the class described, a chute through which a card is adapted to descend, an enclosure into which said card is adapted to be received from said chute, a member pivotally carried by the enclosure and serving to support the card in a tilting movement from a vertical position to a horizontal position, means for pivotally moving said pivotally carried member, a member for supporting said card in said horizontal position, and means for moving said card from said enclosure to a position beneath a stack of cards, in combination with a structure providing a compartment for said stack of cards.

7. In an apparatus of the class described, a chute through which a card is adapted to descend, an enclosure into which said card is adapted to be received from said chute, a member pivotally carried by the enclosure and serving to support the card in a tilting movement from a vertical position to a horizontal position, a member for supporting said card in said horizontal position, means for moving said card from said enclosure to a position beneath a stack of cards, said means including a follower movable upon said card supporting member, and means for pivotally moving said pivotally carried member and said follower in timed relation with respect to each other to move said card beneath said stack of cards, in combination with a structure providing a compartment for said stack of cards.

8. In an apparatus of the class described, a chute through which a card is adapted to descend, an enclosure into which said card is adapted to be received from said chute, a member pivotally carried by the enclosure and serving to support the card in a tilting movement from a vertical position to a horizontal position, a member for supporting said card in said horizontal position, means for moving said card from said enclosure to a position beneath a stack of cards, said means including a follower movable upon said card supporting member, and means for pivotally moving said pivotally carried member and said follower in timed relation with respect to each other to move said card beneath said stack of cards, in combination with a structure providing a compartment for said stack of cards, and means for supporting the stack of cards in said compartment comprising separate mechanisms alternately operable to support said stack of cards in said enclosure when said card is moved from said enclosure by said follower to the bottom of said stack of cards, and means for operating said separate mechanisms in timed relation with respect to each other whereby one of said mechanisms will be moved from card supporting position while the other mechanism will be moved into card supporting position during the movement of the card from said enclosure by said follower to the bottom of the stack of cards in said compartment.

9. An apparatus of the class described comprising a structure providing a compartment within which a stack of cards is adapted to be confined, a trough adapted to receive a card to be moved into said compartment beneath the stack of cards therein, an inclined chute for delivering to said trough a card in an inclined position with respect to a vertical plane, whereby said card by gravity will tilt to a horizontal position upon said trough, means for moving said card, in said horizontal position upon said trough, from said trough to the bottom of the stack of cards in said compartment, and means for successively moving cards from the top of said stack to a position for movement through said chute.

10. An apparatus of the class described comprising a structure providing a compartment within which a stack of cards is adapted to be confined, a trough adapted to receive a card to be moved into said compartment beneath the stack of cards therein, an inclined chute for delivering to said trough a card in an inclined position with respect to a vertical plane, whereby said card by gravity will tilt to a horizontal position upon said trough, means for moving said card, in said horizontal position upon said trough, from said trough to the bottom of the stack of cards in said compartment, and means for successively moving cards from the top of said stack to a position for movement through said chute, said first-named means including a follower movable longitudinally of said trough, separate mechanisms for alternately supporting the cards in said compartment when said follower is operable to move the card from said trough to the bottom of said stack of cards, and means for operating said separate mechanisms in timed relation with respect to each other and with respect to said follower.

11. An apparatus of the class described comprising a member having a surface upon which cards from a stack of cards are adapted to be moved and including an inlet opening to which the cards are successively fed for movement over said surface and an outlet opening through which the cards pass from said surface, and spaced sight openings through which the cards are successively viewed in their movement over said surface from the inlet opening to the outlet opening, means for moving said cards over said surface from the inlet opening to the outlet opening, means for successively feeding cards from said stack to said inlet opening, means for receiving the cards from said outlet opening, and means for delivering the cards from said card receiving means to a position below said stack of cards, and means for intermittently closing one of said sight openings.

12. An apparatus of the class described comprising a member having a surface upon which cards from a stack of cards are adapted to be moved and including an inlet opening to which the cards are successively fed for movement over said surface and an outlet opening through which the cards pass from said surface, and spaced sight openings through which the cards are successively viewed in their movement over said surface from the inlet opening to the outlet opening, means for moving said cards over said surface from the inlet opening to the outlet opening, means for successively feeding cards from said stack to said inlet opening, means for receiving the cards from said outlet opening, means for delivering the cards from said card receiving means to a position below said stack of cards, said card moving means including a guiding flange provided by said member, a rotatable hub structure, blade members extending radially from said hub structure and operable within said guiding flange and having leading edge portions adapted to engage adjacent edge portions of said cards, and means for intermittently closing one of said sight openings.

13. An apparatus of the class described comprising a structure providing a compartment in which a stack of cards is adapted to be confined, a horizontal support upon which the cards from the top of said stack are adapted to be successively moved, means for moving said cards from said stack to said horizontal support, a chute extending downwardly from said support adapted to receive the cards from said support for gravitational movement down said chute, a receiving trough adapted to receive cards from said chute at an inclination with respect to the vertical, whereby said cards will tilt by gravity to a horizontal position upon said trough, means for moving said card from said trough to a position beneath the stack of cards in said compartment, separate mechanisms for supporting the stack of cards in said compartment, means for guiding the tilting of said card from said vertical position to said horizontal position upon said trough, and means for operating the said separate mechanisms and the said guiding means in timed relation with respect to each other during the operation of said means for moving the card from said trough to the bottom of the stack of cards in said compartment.

RICHARD W. HOOD.

REFERENCES CITED

The following references are of record in the file of this patent:

UNITED STATES PATENTS

| Number | Name | Date |
|---|---|---|
| 445,639 | Herberg | Feb. 3, 1891 |
| 1,611,926 | McDonald | Dec. 28, 1926 |